United States Patent
Hosono et al.

(10) Patent No.: US 11,819,827 B2
(45) Date of Patent: Nov. 21, 2023

(54) SUPPORTED METAL MATERIAL, SUPPORTED METAL CATALYST, METHOD OF PRODUCING AMMONIA, METHOD OF PRODUCING HYDROGEN AND METHOD OF PRODUCING CYANAMIDE COMPOUND

(71) Applicants: JAPAN SCIENCE AND TECHNOLOGY AGENCY, Kawaguchi (JP); TOKYO INSTITUTE OF TECHNOLOGY, Tokyo (JP)

(72) Inventors: Hideo Hosono, Tokyo (JP); Kazuhisa Kishida, Tokyo (JP); Masaaki Kitano, Tokyo (JP); Toshiharu Yokoyama, Tokyo (JP)

(73) Assignees: JAPAN SCIENCE AND TECHNOLOGY AGENCY, Kawaguchi (JP); TOKYO INSTITUTE OF TECHNOLOGY, Tokyo (JP)

( * ) Notice: Subject to any disclaimer, the term of this patent is extended or adjusted under 35 U.S.C. 154(b) by 671 days.

(21) Appl. No.: 16/492,975

(22) PCT Filed: Mar. 16, 2018

(86) PCT No.: PCT/JP2018/010592
§ 371 (c)(1),
(2) Date: Sep. 11, 2019

(87) PCT Pub. No.: WO2018/169076
PCT Pub. Date: Sep. 20, 2018

(65) Prior Publication Data
US 2020/0078771 A1 Mar. 12, 2020

(30) Foreign Application Priority Data
Mar. 17, 2017 (JP) .................. 2017-053525

(51) Int. Cl.
*B01J 23/75* (2006.01)
*B01J 23/46* (2006.01)
(Continued)

(52) U.S. Cl.
CPC ............. *B01J 23/75* (2013.01); *B01J 23/462* (2013.01); *B01J 23/745* (2013.01); *B01J 23/755* (2013.01);
(Continued)

(58) Field of Classification Search
CPC ........ B01J 23/73; B01J 23/462; B01J 23/745; B01J 23/755; B01J 35/1004; B01J 27/24; C01B 3/047; C01C 1/0411
(Continued)

(56) References Cited

U.S. PATENT DOCUMENTS 1,352,177 A    9/1920  Clancy
1,352,178 A *  9/1920  Clancy .................. C01C 1/0411
                                                    423/353
(Continued)

FOREIGN PATENT DOCUMENTS

CN    104640628 A    5/2015
DE      559170 C2    9/1932
(Continued)

OTHER PUBLICATIONS

Haber Process for Ammonia Synthesis Jayant M. Modak Resonance, V 7, No. 9, pp. 69-77 (Year: 2002).*
(Continued)

*Primary Examiner* — Douglas B Call
(74) *Attorney, Agent, or Firm* — BUCHANAN INGERSOLL & ROONEY PC (57) ABSTRACT

Provided are a supported metal material showing high catalytic activity, a supported metal catalyst, a method of producing ammonia and a method of producing hydrogen
(Continued)

using the supported metal catalyst, and a method of producing a cyanamide compound. The supported metal material of the present invention is a supported metal material in which a transition metal is supported on a support, and the support is a cyanamide compound represented by the following general formula (1): $MCN_2$ (1), wherein M represents a group II element of the periodic table, and the specific surface area of the cyanamide compound is 1 $m^2$ $g^{-1}$ or more.

5 Claims, 2 Drawing Sheets

(51) Int. Cl.
| | | |
|---|---|---|
| | *B01J 23/745* | (2006.01) |
| | *B01J 23/755* | (2006.01) |
| | *B01J 35/10* | (2006.01) |
| | *C01B 3/04* | (2006.01) |
| | *C01C 1/04* | (2006.01) |
| | *B01J 27/24* | (2006.01) |

(52) U.S. Cl.
CPC ........... *B01J 35/1004* (2013.01); *C01B 3/047* (2013.01); *C01C 1/0411* (2013.01); *B01J 27/24* (2013.01)

(58) Field of Classification Search
USPC ...................................... 423/648.1
See application file for complete search history.

(56) References Cited

U.S. PATENT DOCUMENTS

| | | |
|---|---|---|
| 2013/0183224 A1 | 7/2013 | Hosono et al. |
| 2015/0217278 A1 | 8/2015 | Hosono et al. |

FOREIGN PATENT DOCUMENTS

| | | | |
|---|---|---|---|
| GB | 140439 A | | 9/1921 |
| GB | 180 314 | | 7/1923 |
| GB | 730298 | * | 5/1955 |
| GB | 730298 A | | 5/1955 |
| JP | 2001246251 A | | 9/2001 |
| JP | 2015-110486 A | | 6/2015 |
| WO | 2012077658 A1 | | 6/2012 |

OTHER PUBLICATIONS

Ammonia Nitridation synthesis and structural change of strontium cyanamide polymorphs Takashi Takeda et al. J. of the Ceramic Soc. of Japan, v115, No. 11, pp. 729-731 (Year: 2007).*
Development of Alkali-promoted ruthenium as a novel catalyst for ammonia synthesis Atsumu Ozaki Acc. Chem.Res. v14, pp. 16-21 (Year: 1981).*
Partial Supplementary European Search Report dated Nov. 10, 2020, by the European Patent Office in corresponding European Application No. 18767282.9-1104, (13 pages).
Office Action dated Jan. 18, 2021, by the Intellectual Property India in corresponding Indian Patent Application No. 201917036776, with an English translation. (5 pages).
International Search Report and Written Opinion issued in corresponding International Patent Application No. PCT/ JP2018/ 010592, and an English translation of the International Search Report, dated Jun. 5, 2018. (14 pages).
Kitano, et al., "Ammonia synthesis using a stable electride as an electron donor and reversible hydrogen store," Nature Chemistry, online DOI: 10.1038/NCHEM.1476, (Oct. 21, 2012), vol. 4, pp. 934-940.
"Editorial committee of chemistry dictionary," Chemistry dictionary 5, Kyoritsu Shuppan Co., Ltd., (1979), pp. 758-759.
Nagai, et al., "Synthesis of Calcium Cyanamide Using Calcium Carbonate and Ammonia (First Report)," The journal of chemical industry, 43 (8), (1940), pp. 534-538, and an English translation thereof.
Takeda, et al., "Ammonia Nitridation Synthesis and Structural Change of Strontium Cyanamide Polymorphs," Journal of the Ceramic Society of Japan, vol. 115, (2007), pp. 729-731.
Notification of the First Office Action dated Dec. 23, 2021, by China National Intellectual Property Administration in corresponding Chinese Patent Application No. 201880018220.3 and an English translation of the Notification. (20 pages).
Notice of Reasons for Rejection dated Jan. 4, 2022, by the Japanese Patent Office in corresponding Japanese Patent Application No. 2019-506317 and an English translation of the Notice. (9 pages).

* cited by examiner

SUPPORTED METAL MATERIAL, SUPPORTED METAL CATALYST, METHOD OF PRODUCING AMMONIA, METHOD OF PRODUCING HYDROGEN AND METHOD OF PRODUCING CYANAMIDE COMPOUND

TECHNICAL FIELD

The present invention relates to a supported metal material, a supported metal catalyst, a method of producing ammonia and a method of producing hydrogen using the supported metal catalyst, and a method of producing a cyanamide compound.

Priority is claimed on Japanese Patent Application No. 2017-053525, filed Mar. 17, 2017, the content of which is incorporated herein by reference.

BACKGROUND TECHNOLOGY

The Haber-Bosch method, as a typical ammonia synthesis method, is a method of producing ammonia by directly reacting the mixed gas of nitrogen and hydrogen under high temperature and high pressure conditions by using doubly promoted iron catalysts containing several parts by weight of $K_2O$ and $Al_2O_3$ with respect to 100 parts by weight of $Fe_3O_4$. This technology is still used industrially in the manufacturing process almost in the same manner as it was completed.

On the other hand, a method of synthesizing ammonia at a temperature lower than the reaction temperature of the Haber-Bosch method has been studied. A catalyst capable of synthesizing ammonia by coming into contacting with nitrogen and hydrogen has been studied, and a transition metal is considered as its catalytically active component. Among various methods, a method in which ruthenium (Ru) is supported on various supports as a catalytically active component and used as a catalyst for ammonia synthesis has been proposed as an efficient method (for example, Patent Document 1).

It is known that catalysts using transition metals such as Ru are able to synthesize ammonia under milder conditions than the reaction conditions used in the Haber-Bosch method because their activity is very high. For example, it is known that the reaction proceeds at a reaction temperature of 200 to 400° C. and at a low pressure from about atmospheric pressure to about 1.1 MPa.

A calcium aluminosilicate constituted by CaO, $Al_2O_3$, and $SiO_2$, which has the same type of crystal structure as Mayenite is called a "Mayenite type compound". The representative composition of the mayenite type compound is represented by $12CaO \cdot 7Al_2O_3$, and the mayenite type compound has a structure in which two oxygen atoms are included as "free oxide ions" in a space of a cage formed by its lattice framework.

The present inventors have found that a catalyst in which a transition metal is supported as a catalytically active component on a Mayenite compound in which free oxide ions in the Mayenite type compound are substituted with electrons (hereinafter referred to as C12 A7 electride) has a high activity as a catalyst for ammonia synthesis (Patent Document 2, Non-Patent Document 1).

On the other hand, cyanamide compounds such as calcium cyanamide ($CaCN_2$) used mainly for nitrogen fertilizers and agricultural chemicals are known. Calcium cyanamide is generally produced by the lime nitrogen method. The lime nitrogen method is a reaction in which calcium cyanamide is produced by reacting calcium carbide ($CaC_2$) with nitrogen at high temperature. Usually, calcium cyanamide is obtained as a mixture (lime nitrogen) of carbon and by-products such as calcium oxide and calcium hydroxide. The content of calcium cyanamide in the lime nitrogen is usually 60 wt % or less.

The cyanamide compound is also used as an industrial raw material of nitrogen compounds such as cyanide and as a reactant, a nitriding agent or a reducing agent. In this case, cyanamide compounds with high purity are usually used. As a method for producing a cyanamide compound having high purity, for example, a method of producing calcium cyanamide by reacting metal Ca with cyanamide ($H_2CN_2$) in liquid ammonia, or a method of producing calcium cyanamide by synthesizing $Ca(CN)_2$ by reacting metal Ca with HCN in liquid ammonia and pyrolyzing the resulting $Ca(CN)_2$ is disclosed (Patent Document 3). In addition, a method has been reported in which $CaCO_3$ is reacted with ammonia gas or a mixed gas of ammonia and carbon dioxide (Non-patent Document 2).

A method of ammonia synthesis using calcium cyanamide as a catalyst is disclosed. An ammonia synthesis is a method using a mixture of porous calcium cyanamide obtained by thermal decomposition of $Ca(CN)_2$, and a transition metal as a catalyst is disclosed (Patent Document 3). An ammonia synthesis method using calcium cyanamide pretreated with an iron carbonyl compound as a catalyst is also disclosed (Patent Document 4).

PATENT DOCUMENT

[Patent Document 1] Japanese Unexamined Patent Publication No. 2001-246251 A
[Patent Document 2] WO 2012/077658
[Patent Document 3] US Patent Publication No. 1,352,178
[Patent Document 4] German Patent Invention No. 559,170

Non-Patent Literature

Non-Patent Document 1: Kitano, M., Inoue, Y, Yamazaki, Y, Hayashi, F., Kanbara, S., Matsuishi, S., Yokoyama, T., Kim, S. W., Hara, M., Hosono, H., et al., "Nature Chemistry" 4, 934-940 (2012).
[Non-Patent Document 2] Shoichiro Nagai, Goro Yamaguchi, Journal of Industrial Chemistry, 43 (8), 534-538 (1940)

SUMMARY OF THE INVENTION

The ammonia synthesis by the Haber-Bosch method mainly using a double promotion iron catalyst has been put to practical use, but since high temperature and high pressure conditions are required, there is a problem in that the load on equipment and cost is high.

The supported metal catalyst as described in Patent Document 1 usually uses a carbonaceous support such as activated carbon or an inorganic oxide support. However, these supported metal catalysts have low reaction activity and have insufficient performance for practical use.

That is, there is a need for an ammonia synthesis catalyst having sufficient reaction activity even under conditions of lower temperature and lower pressure than the reaction conditions of the Haber-Bosch method.

The catalyst described in Patent Document 2 has sufficient reaction activity even under low temperature and low pressure reaction conditions. However, the catalyst described in Patent Document 2 requires high-temperature reaction conditions during its production.

That is, there is a need for an ammonia synthesis catalyst having high reaction activity, which can be produced by a simpler method than the catalyst.

The ammonia synthesis method using $CaCN_2$ as a catalyst described in Patent Documents 3 and 4 requires complicated reaction operation and manufacturing equipment because metal Ca and liquid ammonia are used for producing high purity $CaCN_2$ used for the catalyst. There is a disadvantage in terms of manufacturing cost. In addition, in order to ensure the stability of $CaCN_2$, it is necessary for the mixed transition metal to form a nitride during the ammonia synthesis reaction. Therefore, the reaction temperature in the case of synthesizing ammonia using this catalyst is limited to 400 to 600° C., which is a temperature of formation of the transition metal nitride, and there is a problem in that the efficiency of ammonia synthesis is poor.

On the other hand, when producing a cyanamide compound, by using the conventional lime nitrogen method, a mixture containing various by-products is produced, so it is unsuitable for producing a high-purity cyanamide compound.

In addition, the method for producing a cyanamide compound having high purity is also disadvantageous in terms of production efficiency since the production method usually requires a complicated reaction apparatus and production equipment due to using liquid ammonia.

Since the method for producing a cyanamide compound described in Non-Patent Document 2 uses ammonia gas, the load on a reactor or the like is relatively small. However, for example, it is necessary to heat at 700° C. or more in the production of calcium cyanamide, which makes it disadvantageous in terms of energy.

There is a need for an ammonia synthesis catalyst that can be handled in the atmosphere and easily manufactured, and in particular, there is a need for an ammonia synthesis method that efficiently produces ammonia under low temperature and low pressure.

There is also a need for a method of producing a high purity cyanamide compound, which not only does not require special reaction equipment but is also advantageous in terms of energy and the like.

Means for Solving the Problems

The present inventors have found that it is possible to obtain a catalyst having a high ammonia synthesis activity and having an advantage in terms of production by loading a transition metal on a cyanamide compound and using a catalyst having a large specific surface area as a catalyst, which has been achieved in the present invention.

Furthermore, the present inventors have found that high purity cyanamide compounds can be efficiently produced by reacting metal salts with ammonia gas in a specific temperature range, which has been achieved in the present invention.

That is, the present invention relates to the following matters.

[1] A supported metal material in which a transition metal is supported on a support,
wherein the support is a cyanamide compound represented by the following general formula (1):

$$MCN_2 \quad (1)$$

wherein M represents a group II element of the periodic table, and
a specific surface area of the cyanamide compound is 1 m² g⁻¹ or more.

[2] The supported metal product according to [1], wherein M is at least one selected from the group consisting of Ca, Sr and Ba.

[3] The supported metal product according to [1] or [2], wherein a loading amount of the transition supported metal is 0.01 parts by weight or more and 50 parts by weight or less with respect to 100 parts by weight of the support.

[4] A supported metal catalyst comprising the supported metal material according to any one of [1] to [3].

[5] The supported metal catalyst according to [4], which is a catalyst for ammonia synthesis.

[6] The supported metal catalyst according to [5], wherein the transition metal is at least one selected from the group consisting of Ru, Co, and Fe.

[7] A method of producing ammonia, comprising reacting nitrogen and hydrogen in the presence of the supported metal catalyst according to any one of [4] to [6].

[8] The method of producing ammonia according to [7], wherein the reaction temperature at the time of reacting nitrogen and hydrogen is 100° C. or more and 600° C. or less.

[9] The method for producing ammonia according to [7] or [8], wherein the reaction pressure when reacting nitrogen and hydrogen is 0.01 MPa or more and 20 MPa or less.

[10] The method for producing ammonia according to any of [7] to [9] wherein a volume ratio of hydrogen to nitrogen ($H_2/N_2$=(volume)/(volume)) when reacting nitrogen and hydrogen is 0.4 or more and 3 or less.

[11] The supported metal catalyst according to [4], which is an ammonia decomposition catalyst.

[12] The supported metal catalyst according to [4] or [11], wherein the transition metal is at least one selected from the group consisting of Ru, Co, Fe, and Ni.

[13] A method of producing hydrogen, comprising reacting ammonia in the presence of the supported metal catalyst according to any one of [4], [11] or [12] to be decomposed to nitrogen and hydrogen.

[14] The method for producing hydrogen according to [13], wherein the reaction temperature at the time of decomposing ammonia is 200° C. or more and 800° C. or less.

[15] The method for producing hydrogen according to [13] or [14], wherein the reaction pressure at the time of decomposing ammonia is 0.01 MPa or more and 1.0 MPa or less.

[16] A method for producing a cyanamide compound represented by the following general formula (1):

$$MCN_2 \quad (1)$$

wherein M represents a group II element of the periodic table, and
ammonia gas is subjected to act on the carbonate of M or the organic acid salt having one or more carbon atoms at a temperature of 650° C. or less.

[17] The method for producing the cyanamide compound according to [16], wherein the specific surface area of the cyanamide compound obtained by the above-mentioned production method is 1 m²g⁻¹ or more.

[18] The method for producing a cyanamide compound according to [16] or [17], wherein M is at least one selected from the group consisting of Ca, Sr and Ba.

The supported metal material of the present invention can be used as a supported metal catalyst and exhibits high catalytic activity when it is used as the supported metal catalyst of the present invention.

The supported metal catalyst of the present invention is particularly suitable as a catalyst for ammonia synthesis because it has high ammonia synthesis activity even at a low reaction temperature and a low reaction pressure. By producing ammonia using the supported metal catalyst of the present invention, ammonia can be synthesized with less energy, and even if the synthesis reaction is repeated, the catalyst activity is not lowered. Therefore, synthesis can be carried out at a high efficiency and with a long-term chemical and thermal stability.

When the supported metal catalyst of the present invention is used, in a method of continuously synthesizing ammonia by the reaction of hydrogen and nitrogen, ammonia can be synthesized not only using an inexpensive compound composed only of elements having higher ranks of Clark number such as calcium, carbon and nitrogen, but also with a low energy consumption at low reaction pressure. Furthermore, even if the synthesis reaction is repeated, no decrease in catalytic activity is observed. Therefore, synthesis can be carried out at a high efficiency and with long-term chemical and thermal stability.

The supported metal material and the supported metal catalyst of the present invention can be obtained by loading a transition metal on the cyanamide compound. Since the cyanamide compound is a compound that can be handled relatively easily, it can be manufactured in a simple and highly safe method, and further cost reduction can be expected.

The supported metal material of the present invention has high efficiency as an ammonia decomposition catalyst and is, therefore, suitable for a method of producing hydrogen by ammonia decomposition.

The method for producing a cyanamide compound of the present invention can efficiently produce a cyanamide compound of high purity without requiring a complicated production apparatus or method. Specifically, the cyanamide compound can be efficiently produced only by supplying the ammonia gas which is the raw material without supplying the carbon-containing auxiliary raw material gas such as $CO_2$.

Furthermore, the shape or the like of the obtained cyanamide compound can be easily adjusted by adjusting the shape or the like of the metal salt used as a raw material for a cyanamide compound.

Therefore, physical properties of the supported metal material using the cyanamide compound can be easily adjusted, and furthermore, when the supported metal material is used as a supported metal catalyst, it can be easily molded to obtain a catalyst with a desired shape.

DETAILED DESCRIPTION OF THE INVENTION

Hereinafter, the present invention will be described in more detail. However, the invention is not necessarily limited to the specifically described embodiments.

The invention is described in detail below.

A first aspect of the present invention is a supported metal material in which a transition metal is supported on a support, wherein the support is a cyanamide compound represented by the following general formula (1):

$$MCN_2 \qquad (1)$$

wherein M represents a group II element of the periodic table, and wherein a specific surface area of the cyanamide compound is 1 $m^2g^{-1}$ or more.

Hereinafter, the supported metal material may be simply referred to as a "supported material".

The first aspect of the present invention also relates to a supported metal catalyst comprising the supported metal material.

A second aspect of the present invention relates to a supported metal catalyst, a method of producing ammonia using the supported metal catalyst, or a method of producing hydrogen.

A third aspect of the present invention is a method of producing a cyanamide compound represented by the above general formula (1), and the method includes subjecting a carbonate of M or an organic acid salt of M having one or more carbon atoms to act with ammonia gas at 650° C. or less.

Each invention will be described in detail below.

(Supported Metal Material)

The supported metal material of the present invention is a supported metal material in which a transition metal is supported on a support, wherein the support is a cyanamide compound represented by the above general formula (1), and the specific surface area of the cyanamide compound is 1 $m^2g^{-1}$ or more.

<Cyanamide Compound>

The cyanamide compound used in the present invention is a cyanamide compound represented by the following general formula (1).

$$MCN_2 \qquad (1)$$

In the general formula (1), M represents an element of group II of the periodic table.

Specifically, M is at least one element selected from the group consisting of Be, Mg, Ca, Sr, and Ba, preferably from the group consisting of Mg, Ca, Sr, and Ba, and more preferably from the group consisting of Ca, Sr, and Ba because they are stable without decomposition even under high-temperature reaction conditions. Ca is more preferable because the atomic number is small and area per unit weight (specific surface area) can be easily increased.

That is, the cyanamide compound used in the present invention is specifically a salt of cyanamide (Cyanamide $CN_2H_2$) with an element of group II of the periodic table.

A specific surface area of the cyanamide compound used in the present invention is 1 $m^2g^{-1}$ or more. The larger specific surface area is more advantageous, especially when the cyanamide compound is used for a supported metal catalyst. The specific surface area is preferably 3 $m^2g^{-1}$ or more, more preferably 5 $m^2g^{-1}$ or more, and still more preferably 10 $m^2g^{-1}$ or more. The upper limit is not particularly limited but is usually 200 $m^2g^{-1}$ or less, preferably 100 m²g⁻¹ or less, and more preferably 50 m²g⁻¹ or less. Being below the upper limit is advantageous in terms of workability.

The method for producing the cyanamide compound used in the present invention is not particularly limited, but it is preferable to use the production method shown below (the third aspect of the present invention).

<Synthesis of Cyanamide Compound>

The method for producing a cyanamide compound according to the third aspect of the present invention includes subjecting ammonia gas to act with a carbonate of M or an organic acid salt having one or more carbon atoms of M (hereinafter, sometimes both are referred to as a raw material salt).

Specifically, a cyanamide compound is obtained by subjecting ammonia gas to act with a carbonate of an element of group II of the periodic table; or a salt of an element of group II of the periodic table and an organic acid having one or more carbon atoms.

In the production method of the present invention, the compound which serves as an element source of M and which may be decomposed by acting ammonia gas at the reaction temperature to be described later is used. And specifically, a carbonate and an organic acid salt having one or more carbon atoms which can be decomposed similarly as the carbonate are used.

As an example, when the raw material salt is a carbonate, the method of producing a cyanamide compound of the present invention proceeds according to the following formula.

$$MCO_3 + 2NH_3 \rightarrow MCN_2 + 3H_2O$$

The raw material salt is not particularly limited, but specific examples of the carbonate include magnesium carbonate, calcium carbonate, strontium carbonate, barium carbonate, and the like.

A crystal system of the carbonate is not particularly limited but may be a crystalline polymorph such as calcite, aragonite, and vaterite; or an amorphous one. Moreover, a powder containing surface-treated particles of carbonate with the dispersing agent may be used.

The organic acid having a carbon number of one or more as the raw material salt is not particularly limited, but those which are easily decomposed at the temperature of the reaction with ammonia gas described later are preferable, and those having a lower decomposition temperature are more preferable. Moreover, the organic acid having a small carbon number is preferable.

The upper limit of the carbon number is not particularly limited but is usually 12 or less, and preferably 6 or less in terms of the ease of preparation.

Specifically, for example, glycolic acid, citric acid, malic acid, tartaric acid, lactic acid, formic acid, acetic acid, propionic acid, butyric acid, valeric acid, oxalic acid, malonic acid, succinic acid, adipic acid, fumaric acid, maleic acid, alanine, arginine, asparagine, aspartic acid, or the like may be used. And salts of any combination of these organic acids with M may be used.

Glycolates, citrates, malates, tartrates, lactates, formates, acetates, propionates, or butyrates oxalate, malonate and maleate, which are water-soluble organic acid salts, are preferably used in terms of ease of preparation. Among them, citrate, malate, lactate, acetate or oxalate may be used more preferably, in view of easy thermal decomposition.

The raw material salt may be a salt containing crystallization water or an anhydrous salt.

As the raw material salt, carbonates or organic acid salts having 1 to 6 carbon atoms are preferable in terms of handleability, and carbonates are more preferable in terms of availability.

The form of the raw material salt is not particularly limited, and may be any one of forms including powder, lump, film and the like, but is preferably powder.

In particular, in order to produce a cyanamide compound having a specific surface area of 1 m²g⁻¹ or more, the cyanamide compound may be produced by using a raw material salt having a large specific surface area but is not particularly limited thereto.

The ammonia gas used in the production method of the present invention is not limited as long as it does not inhibit the reaction represented by the above reaction formula, and any of commercially available ammonia gas and ammonia gas obtained by various synthesis methods may be used.

The ammonia gas used in the present invention may be ammonia alone for the reaction with the raw material salt or may be diluted with various carrier gases as long as the reaction represented by the reaction formula is not inhibited. It is preferable that ammonia be used alone in terms of reduction of the ammonia dilution step and cost.

The carrier gas is not particularly limited, but usually helium, nitrogen, argon, or the like may be used.

In the present invention, when the gas supplied to the reaction with the raw material salt is used as the raw material gas, the water concentration in the raw material gas is not particularly limited, but it is preferable that the water concentration be lower. Specifically, it is preferable that the water concentration be 0.1 volume % or less, and it is more preferable that the water concentration be 0.01 volume % or less. As shown in the above reaction formula, when the water concentration is high, the formation of the cyanamide compound may be suppressed.

In the production method of the present invention, the raw material salt is reacted with ammonia gas at a temperature of 650° C. or less. When the temperature is exceeded, side reactions such as decomposition of the raw material salt may occur. The reaction temperature with ammonia gas is preferably 630° C. or less, more preferably 610° C. or less, still more preferably 600° C. or less. And the lower limit is not particularly limited but is usually 450° C. or more, preferably 480° C. or more, more preferably 500° C. or more. If the temperature is lower than the lower limit, sufficient reaction does not occur.

In the production method of the present invention, the reaction pressure is not particularly limited, but the reaction is preferably carried out under low pressure conditions. As shown in the above reaction formula, the method for producing the cyanamide compound of the present invention is a volume increasing reaction in which three molecules of H₂O are generated from two molecules of NH₃. More preferably, the synthesis is carried out at atmospheric pressure. This eliminates the need for a pressure adjustment device and the like, which makes it advantageous in terms of cost.

In the production method of the present invention, the reaction method of the raw material salt and the ammonia gas is not particularly limited as long as the effects of the present invention can be obtained. Generally, ammonia gas is passed through the raw material salt. Usually, ammonia gas is introduced into a reaction vessel containing the raw material salt.

The type of reactor is not particularly limited. A reactor that can be usually used when using a gas for the reaction may be used. As a specific reaction system, for example, a batch reaction system, a closed circulation reaction system, a flow reaction system or the like may be used. Among them, the flow reaction system is preferable from the practical viewpoint.

Since the synthesis reaction of the cyanamide compound used in the present invention is accompanied by the formation of water simultaneously with the formation of $MCN_2$ as described above, the equilibrium can be shifted by removing water from the reaction system. Therefore, in consideration of water removal, it is preferable to carry out the reaction using a reaction apparatus which is an open system capable of flowing gas. The specific shape is not particularly limited, but a cylinder (tube) type suitable for gas flow is preferable.

The reaction method can be carried out either using a batch reaction system or a continuous reaction system, but from the viewpoint of production efficiency, the continuous reaction system is preferred.

The reaction apparatus which is suitable for use in the continuous reaction is a gas flow type heater, and examples thereof include a rotary kiln, a shaft type stirring type calciner, a kneader type calciner, a fluid heating furnace and the like. In addition, the reaction may be performed while subjecting the raw material salt to the flow. Examples of a device for subjecting the raw material salt to the flow include a device for moving the raw material salt by rotating the main body (drum), a device for moving the raw material salt forcibly with a screw, a device for placing the raw material salt on an apron (dish plate receiver), and a device for moving the raw material salt together with the gas flow. Among them, a rotary drum type device and a screw conveyor type device are more preferable. Moreover, when the raw material salt or reaction product adheres, a device having a function which can remove the attachment may be used.

The method for producing the cyanamide compound of the present invention is not particularly limited, but a cyanamide compound having a large specific surface area can be obtained, and it is preferable that a cyanamide compound having a specific surface area of 1 $m^2g^{-1}$ or more be obtained. Specifically, when a raw material salt having a large specific surface area, for example, a raw material salt having a specific surface area of 1 $m^2g^{-1}$ or more is used, the specific surface area of the raw material salt is usually maintained or further increased. As a result, a cyanamide compound having a large specific surface area may be obtained.

The reaction product obtained by the method of producing a cyanamide compound of the present invention usually has a high content of the cyanamide compound. Specifically, the raw material salt is converted to a cyanamide compound as the reaction proceeds, and a mixture with the raw material salt is formed initially, and as the reaction proceeds, the content of the cyanamide compound in the mixture increases. In the production of the cyanamide compound of the present invention, the reaction product can be analyzed by X-ray diffraction or the like to confirm the content of the raw material salt, so that the desired content can be adjusted. By confirming, it is possible to obtain a reaction product having a high content of cyanamide compound. The content of the cyanamide compound in the reaction product (hereinafter sometimes referred to as "purity of cyanamide compound") is not particularly limited, but is usually 70 wt % or more, preferably 80 wt % or more, more preferably 90 wt % or more, and still more preferably 95 wt % or more.

The X-ray diffraction analysis of the reaction product is not particularly limited. For example, when a crystal part and an amorphous part are mixed therein, the content is usually determined by the value measured in the crystal part.

In addition to the target cyanamide compound, the reaction product may also contain the raw material salt, its decomposition product, or the like. The content of these other products is preferably small. As described above, in the method for producing a cyanamide compound of the present invention, the content of the raw material salt can be appropriately reduced, and the content of the decomposition product is also small.

<Transition Metal>

The transition metal used in the present invention is not particularly limited but is usually a transition metal of group 6, 7, 8, 9, or 10 of the periodic table, preferably a transition metal of group 6, 8 or 9, and more preferably a transition metal of group 8 or 9.

Further, specific metal elements are not particularly limited, but usually, Cr, Mo, Mn, Re, Fe, Ru, Os, Co, Rh, Ni, Pd, or Pt are used, Mo, Re, Fe, Ru, Os, or Co are preferable in terms of high bond energy with nitrogen, Ru, Co, Fe or Ni are more preferable in terms that they have ammonia decomposition activity when used as a supported metal catalyst, Ru, Co or Fe are still more preferable in terms of having ammonia synthesis activity, and Ru is most preferable in terms of having the highest catalytic activity.

Each of the above elements may be used alone or in combination of two or more. Intermetallic compounds of these elements, for example, $Co_3Mo_3N$, $Fe_3Mo_3N$, $Ni_2Mo_3N$, $Mo_2N$, or the like can also be used. Preferably, each element is used alone or in a combination of two or more, and it is more preferable to use each element alone in terms of cost.

Specifically, when the supported metal material of the present invention is used as a catalyst for ammonia synthesis, Ru, Co or Fe is preferable, and Ru is more preferable.

Moreover, when using the supported metal material of this invention as a catalyst for ammonia decomposition, Ru, Co, Fe, or Ni is preferable, and Ru is more preferable.

<Composition of Supported Metal Material>

The loading amount of the transition metal with respect to 100 parts by weight of the cyanamide compound in the supported metal material of the present invention is not particularly limited, but generally 0.01 parts by weight or more, preferably 0.05 parts by weight or more, and more preferably 0.1 parts by weight or more; and usually 30 parts by weight or less, preferably 20 parts by weight or less, and more preferably 15 parts by weight or less. When it is above the lower limit value, the effect of the present invention can be obtained, and if it is below the upper limit value, an effect of the present invention can be obtained wherein the effect matches the loading amount and the cost.

<Specific Surface Area of Supported Metal Material>

The specific surface area of the supported metal material of the present invention is not particularly limited, but is usually the same as the cyanamide compound to be used, and is usually 1.0 $m^2g^{-1}$ or more, preferably 5 $m^2g^{-1}$ or more, and more preferably 10 $m^2g^{-1}$ or more. The upper limit is not particularly limited, but it is usually 200 $m^2g^{-1}$ or less, preferably 100 $m^2g^{-1}$ or less, and more preferably 50 $m^2g^{-1}$ or less. Being below the upper limit is advantageous in terms of workability.

<Form of Supported Metal Material>

The form of the supported metal material of the present invention is not particularly limited, and may be specifically any form such as bulk, powder or film, but is usually powder.

The particle size of the powdery supported metal material is not particularly limited, but it is usually 10 nm or more and 50 µm or less.

Although the particle diameter of the transition metal in the supported metal material of the present invention is not particularly limited, it is usually 1 nm or more and 100 nm or less. Preferably, when used as a catalyst for ammonia synthesis, the particle diameter is preferably 10 nm or less and more preferably 5 nm or less, which is advantageous in terms that the number of step sites that are active sites of nitrogen dissociation increases.

(Method of Manufacturing Supported Metal Material)

The supported metal material of the present invention is produced by loading the transition metal on the cyanamide compound. The production method is not particularly limited, but in general, the cyanamide compound may be produced by loading a transition metal or a compound serving as a precursor of the transition metal (hereinafter, transition metal compound).

The cyanamide compound, which is a raw material of the supported metal material of the present invention, may be a commercially available reagent or an industrial raw material or may be one obtained from a corresponding metal by a known method. It is preferable to use the cyanamide compound obtained by the third aspect.

The method of loading the transition metal on the cyanamide compound used in the present invention is not particularly limited, and known methods may be used. Usually, a method of converting a transition metal compound to a transition metal after loading the transition metal compound on the cyanamide compound may be used, wherein the transition metal compound is a compound of the transition metal which can be converted to the transition metal by reduction, thermal decomposition, or the like.

The transition metal compound is not particularly limited, but an inorganic compound of the transition metal or an organic complex of the transition metal, each of which is easily thermally decomposed, may be used. Specifically, a transition metal complex, a transition metal oxide, or a transition metal salt such as a nitrate, a hydrochloride, or the like may be used.

For example, as a Ru compound, triruthenium dodecacarbonyl $[Ru_3(CO)_{12}]$, dichlorotetrakis (triphenylphosphine) ruthenium (II) $[RuCl_2(PPh_3)_4]$, dichlorotris (triphenylphosphine) ruthenium (II) $[RuCl_2(PPh_3)_3]$, tris (acetylacetonato) ruthenium (III) $[Ru(acac)_3]$, ruthenocene $[Ru(C_5H_5)_2]$, ruthenium nitrosylnitrate $[Ru(NO)(NO_3)_3]$, potassium ruthenate, ruthenium oxide, ruthenium nitrate, ruthenium chloride, and the like can be mentioned.

As a Fe compound, pentacarbonyl iron $[Fe(CO)_5]$, triiron dodecacarbonyl $[Fe_3(CO)_{12}]$, diiron nonacarbonyl $[Fe_2(CO)_9]$, tetracarbonyl iron iodide $[Fe(CO)_4I_2]$, tris (acetylacetonato) iron (III) $[Fe(acac)_3]$, ferrocene $[Fe(C_5H_5)_2]$, iron oxide, iron nitrate, iron chloride $(FeCl_3)$, or the like may be used.

As a Co compound, dicobalt octacarbonyl $[Co_2(CO)_8]$, tris (acetylacetonato) cobalt (III) $[Co(acac)_3]$, cobalt (II) acetylacetonato $[Co(acac)_2]$, cobaltocene $[Co(C_5H_5)_2]$, cobalt oxide, cobalt nitrate, cobalt chloride, or the like may be used.

Among these transition metal compounds, a carbonyl complex of the transition metal such as $[Ru_3(CO)_{12}]$, $[Fe(CO)_5]$, $[Fe_3(CO)_{12}]$, $[Fe_2(CO)_9]$, $[Co_2(CO)_8]$, or the like is preferable, in view that the reduction treatment to be described later can be omitted in the production of the supported metal material of the present invention because the transition metal may be loaded by loading the carbonyl complex and then heating it.

The amount of the transition metal compound used is not particularly limited, and an amount for achieving a desired loading amount can be appropriately used, but the amount usually is 0.01 parts by weight or more with respect to 100 parts by weight of the cyanamide compound to be used, preferably 0.05 parts by weight or more, more preferably 0.1 parts by weight or more; and usually 30 parts by weight or less, preferably 20 parts by weight or less, and more preferably 15 parts by weight or less.

As a method of loading the transition metal compound on the cyanamide compound, specifically, a method such as an impregnation method, a physical mixing method, a CVD method (chemical vapor deposition method), or a sputtering method may be used.

The impregnation method may include the following steps. For example, the cyanamide compound is added to a solution of the transition metal compound and the obtained mixture is stirred. The solvent at this time is not particularly limited, and water and various organic solvents may be used. And an organic solvent is preferable in order to suppress the decomposition of the cyanamide compound. The transition metal compound may be dissolved or dispersed in a solvent.

Then, the mixture is heated to dryness in a stream of an inert gas such as nitrogen, argon, or helium; or under vacuum. The heating temperature at this time is not particularly limited, but it is usually 50° C. or more and 300° C. or less.

The heating time is not particularly limited but is usually 30 minutes or more and 20 hours or less.

When a transition metal compound which may be converted to a transition metal by pyrolysis is used, at this stage, a transition metal is loaded and it becomes the supported metal material of the present invention.

In the case of using a transition metal compound other than the above-mentioned transition metal compound which may be converted to a transition metal by thermal decomposition, a dried and solidified transition metal compound may be reduced to obtain the supported metal material of the present invention.

A method of reducing the transition metal compound (hereinafter referred to as "reduction treatment") is not particularly limited as long as it does not disturb the object of the present invention, and examples thereof include a method in which the transition metal compound is reduced in an atmosphere containing a reducing gas and a method in which a reducing agent such as $NaBH_4$, $NH_2NH_2$ or formalin is added to the solution of the transition metal compound to precipitate the transition metal on the surface of the cyanamide compound. However, the method in which the transition metal compound is reduced in an atmosphere containing a reducing gas is preferable. Examples of the reducing gas include hydrogen, ammonia, methanol (vapor), ethanol (vapor), methane, ethane, and the like.

During the reduction treatment, a component other than the reducing gas which does not inhibit the object of the present invention, particularly the ammonia synthesis reaction, may coexist with the reaction system. Specifically, at the time of the reduction treatment, in addition to the reducing gas such as hydrogen, a gas such as argon or nitrogen which does not inhibit the reaction may be allowed to coexist, and nitrogen is preferably allowed to coexist.

When the reduction treatment is carried out in a gas containing hydrogen, it can be carried out in parallel with the production of ammonia to be described later by allowing nitrogen to coexist with hydrogen. That is, when the supported metal material of the present invention is used as a catalyst for ammonia synthesis described later, by placing the transition metal compound supported on the cyanamide compound in the reaction conditions of the ammonia synthesis reaction, the transition metal compound may be reduced and converted to the transition metal.

The temperature during the reduction treatment is not particularly limited, and it may be 200° C. or higher, preferably 300° C. or higher, and may be 1000° C. or lower, preferably 600° C. or lower. When the reduction treatment is carried out within the above reduction treatment temperature range, the growth of the transition metal occurs sufficiently and within a preferable temperature range.

A pressure during the reduction treatment is not particularly limited, but it may be 0.01 to 10 MPa. When the pressure during the reduction treatment is set to the same condition as the ammonia synthesis condition described later, since complicated operations are unnecessary, the pressure range is preferable in view of production efficiency.

A time of the reduction treatment is not particularly limited, but in the case where the reduction treatment is carried out under normal pressure, it may be 1 hour or more, and preferably 2 hours or more.

In the case where the reaction pressure is high, for example, 1 MPa or more, it is preferably 1 hour or more.

The physical mixing method is a method in which the cyanamide compound and the transition metal compound are mixed in a solid phase and then heated in an inert gas flow such as nitrogen, argon, helium, or under vacuum. The heating temperature and the heating time are the same as those of the impregnation method. The reduction treatment is performed to obtain the supported metal material.

(Supported Metal Catalyst)

The supported metal catalyst of the present invention comprises the supported metal material.

The supported metal catalyst of the present invention is preferably a supported metal catalyst in which a transition metal is supported on a support, and the support is a cyanamide compound represented by the following general formula (1).

$$MCN_2 \quad (1)$$

M represents an element of group II of the periodic table and is the same as M in the supported metal material of the present invention.

The supported metal catalyst of the present invention may use the supported cyanamide compound of the present invention as it is for the reaction or may carry out molding or the like as required. The supported metal catalyst may contain components other than the metal hydroxide and transition metal as long as the effects of the present invention are not impaired. However, it is preferable to use the supported metal material of this invention as it is normally.

As components other than the cyanamide compound and the transition metal, $SiO_2$, $Al_2O_3$, $ZrO_2$, MgO, activated carbon, graphite, SiC or the like may be further contained as a support of the cyanamide compound.

The loading amount of the transition metal in the supported metal catalyst of the present invention is not particularly limited, but generally 0.01 parts by weight or more with respect to 100 parts by weight of the support, preferably 0.05 parts by weight or more, more preferably 0.1 part by weight or more; and usually 30 parts by weight or less, preferably 20 parts by weight or less, and more preferably 15 parts by weight or less. When the loading amount is above the lower limit value, the effect of the present invention can be obtained, and when it is below the upper limit value, an effect of the present invention can be obtained wherein the effect matches the loading amount and the cost.

The specific surface area of the supported metal catalyst of the present invention is not particularly limited but is usually 0.1 $m^2g^{-1}$ or more, preferably 1 $m^2g^{-1}$ or more, and more preferably 3 $m^2g^{-1}$ or more. The upper limit is not particularly limited but is usually 200 $m^2g^{-1}$ or less, preferably 100 $m^2g^{-1}$ or less, and more preferably 50 $m^2g^{-1}$ or less. When the loading amount is below the upper limit, it is advantageous in terms of workability.

The form of the supported metal catalyst of the present invention is not particularly limited, and it may be in any form such as lump, powder, coating or the like, but is preferably powder. The particle size of the supported metal material powder is not particularly limited, but may be 10 nm or more and 50 μm or less.

A particle diameter of the transition metal in the supported metal catalyst of the present invention is not particularly limited but may be 1 nm or more and 100 nm or less. It is preferably 10 nm or less, and more preferably 5 nm or less in view of increasing the number of step sites, which is the active site of nitrogen dissociation.

The supported metal catalyst of the present invention can be used as a shaped body using conventional shaping techniques.

Specifically, the shape may be granular, spherical, tablet, ring, macaroni, four-leaf, dice, honeycomb, or the like. Moreover, the supported metal catalyst can also be used after coating it on a suitable support.

The supported metal catalyst of the present invention can be used as a catalyst for various reactions but is suitable as a catalyst for an ammonia synthesis reaction. Since the catalyst has a high activity for ammonia synthesis, it is possible to produce ammonia with high reaction efficiency.

The reaction activity is not particularly limited when the supported metal catalyst is used as a catalyst for ammonia synthesis, but as an example, the reaction rate of ammonia at a reaction temperature of 340° C. and a reaction pressure of 0.1 MPa is preferably $0.5 \times 10^3$ μmol·$g^{-1}$ $h^{-1}$ or more, more preferably $1.0 \times 10^3$ μmol·$g^{-1}$ $h^{-1}$ or more to be suitable for practical manufacturing conditions, and still more preferably $2.0 \times 10^3$ μmol·$g^{-1}$ $h^{-1}$ or more to be suitable for more efficient manufacturing conditions, and most preferably $3.0 \times 10^3$ μmol·$g^{-1}$ $h^{-1}$ or more to be suitable for still more efficient manufacturing conditions.

In addition, the supported metal catalyst of the present invention is suitable as a catalyst for ammonia decomposition. The catalyst is also highly active in the ammonia decomposition reaction, which is a reverse reaction of ammonia synthesis, and hydrogen can be produced with a high reaction efficiency.

Furthermore, the supported metal catalyst of the present invention may be used in the hydrogenation reaction of unsaturated carbon compounds, for example, the hydrogenation reactions of olefins, acetylene compounds, carbonyl compounds; and the nucleus hydrogenation reactions of aromatic compounds and heterocyclic compounds.

The method of producing ammonia using the supported metal catalyst of the present invention is described below.

(Method of Producing Ammonia)

The method for producing ammonia of the present invention is a method of synthesizing ammonia by reacting hydrogen and nitrogen on a catalyst, wherein the supported metal catalyst of the present invention is used as the catalyst.

A specific production method is not to be limited as long as it is a method of subjecting hydrogen and nitrogen to contact with the catalyst, and production method can be suitably carried out according to a known production method.

In the method for producing ammonia of the present invention, ammonia is usually produced by heating the catalyst when subjecting hydrogen and nitrogen to contact with the catalyst.

The reaction temperature in the production method of the present invention is not particularly limited, but is usually 200° C. or more, preferably 250° C. or more, more preferably 300° C. or more; and usually 600° C. or less, preferably 500° C. or less, and more preferably 450° C. or less. Since the ammonia synthesis is an exothermic reaction, a low temperature range is advantageous for ammonia synthesis in terms of chemical equilibrium, but in order to obtain a sufficient ammonia synthesis rate, it is preferable to carry out the reaction within the above temperature range.

In the method for producing ammonia of the present invention, the molar ratio of nitrogen and hydrogen to be subjected to contact with the catalyst is not particularly limited, but usually the ratio of hydrogen to nitrogen ($H_2/N_2$ (volume/volume)) is usually 0.4 or more, preferably 0.5 or more, more preferably 1 or more; and usually 10 or less, preferably 5 or less.

The reaction pressure in the method for producing ammonia of the present invention is not particularly limited, but is usually 0.01 MPa or more in term of the pressure of mixed gas containing nitrogen and hydrogen, preferably 0.1 MPa or more; and usually 20 MPa or less, preferably 15 MPa or less, and more preferably 10 MPa or less.

Further, in consideration of practical use, it is preferable to carry out the reaction under a pressure condition higher than atmospheric pressure.

In the method for producing ammonia of the present invention, it is preferable to remove water and oxides adhering to the catalyst using hydrogen gas or the like before subjecting nitrogen and hydrogen to contact with the catalyst. As a method of the removal, reduction treatment may be mentioned.

In the production method of the present invention, in order to obtain a better ammonia yield, it is preferable that the water content in nitrogen and hydrogen used in the production method of the present invention be small, and there is no particular limitation. The total water content in the mixed gas of nitrogen and hydrogen is 100 ppm or less and preferably 50 ppm or less.

In the method for producing ammonia of the present invention, a reaction vessel system is not particularly limited, and a reaction vessel system that can be used for an ammonia synthesis reaction may be used. As a specific reaction system, for example, a batch reaction system, a closed circulation reaction system, a flow system reaction system, or the like may be used. Among them, the flow reaction system is preferable from the practical viewpoint. In addition, any method of using a single type of reactor packed with a catalyst or connecting a plurality of reactors, and using a reactor having a plurality of reaction layers in the reactor may be used.

Since the reaction of synthesizing ammonia from hydrogen and nitrogen is an exothermic reaction accompanied by volume contraction, it is preferable from an industrial viewpoint to remove the heat of reaction in order to increase the ammonia yield. And known reactors having commonly-used heat removal means may be used. For example, specifically, a plurality of reactors filled with a catalyst may be connected in series, and an intercooler may be installed at the outlet of each reactor to remove heat.

In the ammonia production method of the present invention, the ammonia synthesis catalyst produced by the method of the present invention can be used alone or in combination with other known catalysts which may be used for ammonia synthesis.

The ammonia obtained by the method for producing ammonia of the present invention can also be used in the method for producing a cyanamide compound according to the third aspect of the present invention.

(Method of Producing Hydrogen)

Hereinafter, a method for decomposing ammonia to produce hydrogen using the supported metal catalyst of the present invention will be described.

The method for producing hydrogen of the present invention is a method of using the supported metal catalyst of the present invention as a catalyst and reacting ammonia on the catalyst to decompose it to synthesize hydrogen and nitrogen.

It is a reaction represented by the following formula (2).

$$2NH_3 \rightarrow 3H_2 + N_2 \qquad (2)$$

A specific production method is not particularly limited as long as ammonia is subjected to contact with the catalyst and decomposed to synthesize hydrogen. And the production can be appropriately performed according to known production methods.

In the method for producing hydrogen of the present invention, usually, while subjecting ammonia to come into contact with the catalyst, the catalyst is heated to produce hydrogen and nitrogen.

The reaction temperature in the production method of the present invention is not particularly limited, but is usually 200° C. or more, preferably 250° C. or more, more preferably 300° C. or more, and usually 800° C. or less, preferably 600° C. or less, and more preferably 500° C. or less. Since the ammonia decomposition reaction is an equilibrium reaction and an endothermic reaction, a high temperature range is advantageous, but in order to obtain a sufficient ammonia decomposition reaction rate, it is preferable to carry out the reaction in the above temperature range.

In the temperature range, the decomposition reaction proceeds sufficiently, and it is advantageous also in terms of equipment.

When Ru is used as the transition metal, the reaction temperature is more preferably 400° C. or more and 600° C. or less. When Ni or Co is similarly used, the reaction temperature is more preferably 500° C. or more and 750° C. or less.

The reaction pressure in the method for producing hydrogen of the present invention is not particularly limited, but is usually 0.01 MPa or more, preferably 0.05 MPa or more; and usually 1.0 MPa or less, preferably 0.5 MPa or less, and more preferably 0.1 MPa or less.

Since the ammonia decomposition reaction is an equilibrium reaction and a reaction in which volume increases, low pressure conditions are advantageous, but in order to obtain a sufficient ammonia decomposition reaction rate, the reaction should be carried out in the above preferable pressure range. Also, in terms of equipment, it is advantageous to carry out the reaction at 0.1 MPa.

The ammonia used in the method for producing hydrogen of the present invention is not particularly limited but may be either ammonia alone or ammonia diluted with a balance gas. That is, ammonia gas with a volume fraction of 0.1 to 100% may be used.

In the method for producing hydrogen of the present invention, since it is necessary to separate the produced hydrogen and nitrogen, there is no particular limitation, but it is preferable that the ammonia volume fraction be high, and the volume fraction is preferably 5% or more, more preferably 20% or more, and still more preferably 70% or more.

The weight hourly space velocity (WHSV) of ammonia is not particularly limited, but a high $NH_3$ conversion can be obtained by carrying out the reaction usually at 500 ml·g$^{-1}$ h$^{-1}$ or more.

In the method for producing hydrogen according to the present invention, it is preferable to expose the catalyst to an atmosphere of a reducing gas such as hydrogen to activate the transition metal which is a catalytically active component before subjecting ammonia to contact with the catalyst. Although the temperature at the time of the exposure is not specifically limited, the temperature is usually 300° C. or more and 700° C. or less from the viewpoint of improvement of catalytic conversion. Moreover, the time of the exposure is not specifically limited and is usually 30 minutes or more and 2 hours or less.

In the method for producing hydrogen of the present invention, the type of reaction vessel is not particularly limited, and a reaction vessel that is usually used for the ammonia decomposition reaction may be used. As a specific reaction system, for example, a batch reaction system, a closed circulation reaction system, a flow reaction system or the like may be used, and among them, the flow reaction system is preferable from the practical viewpoint.

Since the ammonia decomposition reaction is an endothermic reaction, it is advantageous to carry out the reaction while supplying the heat of reaction, and known industrial methods for supplying the heat of reaction may be used to increase the yield. For example, a method of performing an ammonia decomposition reaction while oxidizing a part of ammonia raw material with air to obtain combustion heat may be used.

Further, the material of the reaction vessel is not particularly limited, and known materials for ammonia decomposition reaction may be used. For example, a normal gas phase-solid phase contact reaction apparatus using a corrosion-resistant material such as stainless steel may be used.

In the present invention, the ammonia decomposition reaction may be carried out using one type of reactor filled with a catalyst, or a plurality of reactors, as in the conventional method. Moreover, any method of connecting a plurality of reactors or any method of reactors having a plurality of reaction layers in the same reactor may be used.

EXAMPLE

Hereinafter, the present invention will be described in more detail by way of examples, but the present invention is not limited by these examples.

(BET Specific Surface Area Measurement)

The measurement of the BET specific surface area was performed by adsorbing nitrogen gas on the surface of the object at liquid nitrogen temperature and measuring the amount of nitrogen adsorbed on the monolayer. The measurement conditions are described as follows.

[Measurement Condition]
Measuring device: manufactured by MicrotracBEL, specific surface area/pore size distribution measurement instrument, BELSORP-mini II
Adsorbed gas: nitrogen (99.99995% by volume)
Adsorption temperature: liquid nitrogen temperature (−196° C.)

(Evaluation of Content of Cyanamide Compound in Reaction Product)

The content of the cyanamide compound in the synthesized reaction product was determined by analyzing the powder X-ray diffraction measurement result by the Rietveld method. The content was obtained by fitting the diffraction pattern of the synthetic sample obtained by the powder X-ray diffraction method and the theoretical diffraction pattern assuming a mixed sample containing $CaCN_2$, $CaCO_3$, and CaO by the least squares method to refine the parameters concerning the crystal structure.

[Measurement Condition]
Measuring device: manufactured by BRUKER, X-ray diffractometer, D8 ADVANCE
X-ray source: CuKα
Measurement temperature: Ambient temperature
Measurement angle range: 10 to 80°
Scan speed: 0.2 seconds/step
Scan step: 0.02°
Analysis program: RIETAN-FP (F. Izumi and K. Momma, "Three-dimensional visualization in powder diffraction," Solid State Phenom., 130, 15-20 (2007).)

(Ru Dispersion Measurement)

The measurement of the Ru dispersion was determined by a pulse adsorption method using carbon monoxide (CO) molecules. Assuming that CO molecules were adsorbed on the surface of the object and one CO molecule was chemisorbed per Ru atom, a number of Ru atoms exposed on the surface was estimated from the number of adsorbed CO molecules. Then the number of Ru atoms exposed on the surface was divided by a total number of Ru atoms supported on the support. Specifically, it is obtained by the following equation. The measurement conditions are described as follows.

(Ru dispersion)=(the number of Ru atoms exposed on the surface)/(the total number of Ru atoms supported)×100(%)

(The number of Ru atoms exposed on the surface was estimated as CO/Ru=1)

[Measurement Condition]
Measuring device: manufactured MicrotracBEL, catalyst analyzer, BELCAT-A
Adsorption gas: CO—He mixed gas (CO concentration: 9.5% by volume)
Adsorption temperature: 50° C.
Support gas: He
Gas detector: TCD In the evaluation of the supported metal catalyst of the present invention as an ammonia synthesis catalyst, the amount of $NH_3$ produced using the ammonia synthesis catalyst of the present invention is measured by using a gas chromatograph method directly, or by a method including dissolving generated $NH_3$ in an aqueous solution of sulfuric acid, and then quantifying it by using an ion chromatograph. The ammonia synthesis rate was determined by using the obtained result of the generated amount of $NH_3$ and the ammonia synthesis activity was evaluated by using the obtained ammonia synthesis rate.

(Gas Chromatograph (GC) Analysis)

The amount of ammonia produced in the following Examples and Comparative Examples was determined by gas chromatography (GC) analysis using an absolute calibration curve method. The measurement conditions are as follows.

[Measurement Condition]
Measuring device: manufactured by Shimadzu Corporation, gas chromatograph, GC-14B
Column: manufactured by GL Science, Porapak Q4 1000 mm
Column temperature: 80° C.
Carrier gas: He
Gas detector: TCD (Ion Chromatographic Analysis)

The amount of ammonia produced in the following Examples and Comparative Examples was determined by dissolving the produced ammonia gas in a 0.05 M aqueous sulfuric acid solution and using ion chromatography analysis of the solution by using an absolute calibration curve method. The measurement conditions were described as follows.

[Measurement Condition]
Measuring device: manufactured by Shimadzu Corporation, high performance liquid chromatograph HPLC, Prominence
Column: manufactured by Shimadzu, Shim-pack IC-C4, length 150 mm, inside diameter 4.6 mm
Eluent: mixed aqueous solution of oxalic acid (3 mM) and 18-crown-6-ether (2.0 mM)
Column temperature: 40° C.
Flow rate: 1.0 mL/min (Calculation Method of TOF)

The turnover frequency (TOF) is a number that represents the average number of times that one active site contributed to the reaction per unit time in the catalytic reaction. And the turnover frequency is obtained by dividing the number of reaction molecules generated per unit time by the number of catalytic activity sites. In this example, since the transition metal is Ru and the active site is Ru, the number of Ru atoms exposed on the catalyst surface is determined by CO adsorption, and the turnover frequency was obtained by dividing a number of ammonia molecules generated per unit time by a number of the Ru atoms.

Example 1

<Synthesis of $CaCN_2$>

$CaCN_2$ was synthesized by heating $CaCO_3$ (manufactured by Kojundo Chemical Laboratory Co., Ltd., powder, BET specific surface area: 3.1 $m^2g^{-1}$) at 550° C. for 20 hours under $NH_3$ flow (100 mL/min). The obtained $CaCN_2$ was in the form of powder, and the BET specific surface area was 6.4 $m^2g^{-1}$. The purity of $CaCN_2$ (the content of $CaCN_2$ in the reaction product) was 98.7 wt %. And as other components, the content of $CaCO_3$ was 0.6 wt % and the content of CaO was 0.7 wt % as other components.

<Preparation of $CaCN_2$ Loaded with Ru>

1 g of $CaCN_2$ synthesized by the above method was mixed with 0.042 g of $Ru_3(CO)_{12}$ (manufactured by Aldrich, powder form) in a glove box under an Ar atmosphere, and then sealed in an evacuated silica tube. The temperature of the mixture sealed above was gradually raised to 250° C. while being rotated, and then heated at the same temperature for 2 hours. 2 parts by weight of metal Ru particles were supported on $CaCN_2$ with respect to 100 parts by weight of $CaCN_2$ (hereinafter referred to as 2 wt % $Ru/CaCN_2$, and a cyanamide compound on which Ru was supported may be simply referred to as "supported Ru material"). The BET specific surface area of the supported Ru material was 7.0 $m^2g^{-1}$. The Ru dispersion which was measured by the CO adsorption method was 9.4%.

<Ammonia Synthesis Reaction>

Nitrogen gas ($N_2$) and hydrogen gas ($H_2$) were subjected to contact with the catalyst to carry out a reaction of synthesizing ammonia ($NH_3$). As the catalyst, 0.1 g of the supported Ru material was packed in a glass tube and used, and a synthesis reaction was performed in a fixed bed flow reactor as a reactor. The gas flow rate at the time of reaction was 60 mL/min in total including $N_2$: 15 mL/min and $H_2$: 45 mL/min. The reaction pressure was atmospheric pressure, and the reaction temperature was 340° C. The gas discharged from the fixed bed flow reactor was bubbled into a 0.05 M aqueous sulfuric acid solution, and the generated ammonia was dissolved in the solution, and then the generated ammonium ions were quantified by ion chromatography. The synthesis rate of ammonia at 340° C. was $3.0 \times 10^3$ $\mu mol \cdot g^{-1} \, h^{-1}$. The TOF was $48.9 \times 10^{-3} \, s^{-1}$. The results are shown in Tables 1 and 2.

Example 2

$CaCN_2$ was synthesized in the same manner as in Example 1, except that instead of $CaCO_3$ used in Example 1, $Ca(CH_3COO)_2 \cdot H_2O$ (manufactured by Kanto Chemical Co., Ltd., powder form) was heated at 550° C. for 20 hours under $NH_3$ gas flow. The obtained $CaCN_2$ was in the form of powder, and its BET specific surface area was 15.0 $m^2g^{-1}$.

2 wt % $Ru/CaCN_2$ catalyst was prepared in the same manner as in Example 1 using the obtained $CaCN_2$. The BET specific surface area of the catalyst was 18.1 $m^2g^{-1}$. The Ru dispersion measured by the CO adsorption method was 16.3%.

An ammonia synthesis reaction was carried out under the same conditions as in Example 1 using the supported Ru material as a catalyst. The synthesis rate of ammonia at 340° C. was $2.9 \times 10^3$ $\mu mol \cdot g^{-1} \, h^{-1}$. The TOF was $24.6 \times 10^{-3} \, s^{-1}$. The results are shown in Table 1.

Comparative Example 1

2 wt % $Ru/CaCN_2$ was prepared in the same manner as in Example 1 except that commercially available $CaCN_2$ (manufactured by Tokyo Chemical Industry Co., Ltd., BET specific surface area 0.1 $m^2g^{-1}$) was used instead of $CaCN_2$ used in Example 1. The BET specific surface area of the supported Ru material was 0.2 $m^2g^{-1}$.

The ammonia synthesis reaction was carried out under the same conditions as in Example 1, but no ammonia was obtained, and the synthesis rate of ammonia at 340° C. was 0.0 $mol \cdot g^{-1} \, h^{-1}$. The results are shown in Table 1.

Comparative Example 2

MgO (manufactured by Ube Materials Co., Ltd., 500A, BET specific surface area 40.0 $m^2g^{-1}$) was heated at 500° C. for 6 hours in vacuum to remove surface adsorbed molecules such as water. Next, MgO was added to a THF solution (60 mL) in which $Ru_3(CO)_{12}$ was dissolved in a glove box under an Ar atmosphere, and stirred for 4 hours. At this time, the addition amount of $Ru_3(CO)_{12}$ was adjusted so that the loading amount of Ru was 5 parts by weight with respect to 100 parts by weight of MgO. Thereafter, THF was removed under reduced pressure, and heating was further performed at 450° C. for 1 hour in a vacuum to obtain MgO on which 5 parts by weight of metal Ru fine particles were supported (hereinafter, 5 wt % Ru/MgO).

An ammonia synthesis reaction was carried out under the same conditions as in Example 1 using the above 5 wt % Ru/MgO as a catalyst. The synthesis rate of ammonia at 340° C. was $0.5 \times 10^3$ µmol·g$^{-1}$ h$^{-1}$, and the TOF was $1.7 \times 10^{-3}$ s$^{-1}$. The results are shown in Table 1.

Comparative Example 3

γ-Al$_2$O$_3$ on which 5 parts by weight of metal Ru fine particles with respect to 100 parts by weight of γ-Al$_2$O$_3$ were supported (hereinafter, 5 wt % Ru/γ-Al$_2$O$_3$) was prepared in the same manner as Comparative Example 1, except that γ-Al$_2$O$_3$ (manufactured by Kojundo Chemical Laboratory Co., Ltd., BET specific surface area 91.0 m$^2$g$^{-1}$) was used in place of MgO of Comparative Example 2.

The ammonia synthesis reaction was carried out under the same conditions as in Example 1. The synthesis rate of ammonia at 340° C. was $0.2 \times 10^3$ µmol·g$^{-1}$ h$^{-1}$, and the TOF was $0.3 \times 10^{-3}$ s$^{-1}$. The results are shown in Table 1.

Comparative Example 4

2 wt % Ru/MgO was prepared in the same manner as in Comparative Example 1 except that the loading amount of Ru in Comparative Example 1 was changed to 2 parts by weight. The 2 wt % Ru/MgO was placed in an absolute ethanol solution (100 mL) in which CsNO$_3$ was dissolved, and stirred for 12 hours. At this time, the addition amount of CsNO$_3$ was adjusted such that the amount of Cs was twice as much as the amount of Ru in terms of element ratio. Thereafter, absolute ethanol was removed under reduced pressure to obtain MgO on which 2 wt % of Ru metal fine particles added with Cs was supported (hereinafter, Cs-2 wt % Ru/MgO).

An ammonia synthesis reaction was carried out under the same conditions as in Example 1 using the Cs-2 wt % Ru/MgO obtained above as a catalyst. The synthesis rate of ammonia at 340° C. was $2.0 \times 10^3$ µmol·g$^{-1}$ h$^{-1}$, and the TOF was $5.3 \times 10^{-3}$ s$^{-1}$. The results are shown in Table 1.

TABLE 1

| No. | Catalyst | Catalyst specific surface area (m$^2$ g$^{-1}$) | Ru dispersion (%) | NH$_3$ synthesis rate (µmol · g$^{-1}$ h$^{-1}$) | TOF (×10$^{-3}$ s$^{-1}$) |
|---|---|---|---|---|---|
| Example 1 | 2 wt % Ru/CaCN$_2$ | 7.0 | 9.4 | 3012 | 48.9 |
| Example 2 | 2 wt % Ru/CaCN$_2$ | 16.3 | 18.1 | 2913 | 24.6 |
| Comparative Example 1 | 2 wt % Ru/CaCN$_2$ | 0.2 | 0.1 | 0 | 0 |
| Comparative example 2 | 5 wt % Ru/MgO | 32.9 | 28.0 | 471 | 1.7 |
| Comparative example 3 | 5 wt % Ru/γ-Al$_2$O$_3$ | 69.5 | 17.0 | 151 | 0.3 |
| Comparative example 4 | Cs-2 wt % Ru/MgO | 32.6 | 58.3 | 2030 | 5.3 |

Catalyst amount: 0.1 g, reaction temperature: 340° C., reaction gas flow rate: 60 mL/min, reaction gas composition: N$_2$/H$_2$ = 1/3, reaction pressure: 0.1 MPa Table 1 shows the results of the ammonia synthesis reaction by the catalyst in which Ru was supported on various supports (the reaction conditions are shown as follows: catalyst amount: 0.1 g, reaction temperature: 340° C., reaction gas flow rate: 60 mL/min, reaction gas composition: N$_2$/H$_2$=1/3, reaction pressure: 0.1 MPa).

Example 3

0.5 wt % Ru/CaCN$_2$ was prepared in the same manner as in Example 1 except that the loading amount of Ru of the supported Ru material described in Example 1 was changed to 0.5 parts by weight.

The ammonia synthesis reaction was carried out under the same conditions as in Example 1 using this supported Ru material as a catalyst. The synthesis rate of ammonia at 340° C. was $0.5 \times 10^3$ µmol·g$^{-1}$ h$^{-1}$. The results are shown in Table 2.

Example 4

1.0 wt % Ru/CaCN$_2$ was prepared in the same manner as in Example 1 except that the loading amount of Ru of the supported Ru material described in Example 1 was 1.0 part by weight.

The ammonia synthesis reaction was carried out under the same conditions as in Example 1 using this supported Ru material as a catalyst. The synthesis rate of ammonia at 340° C. was $0.6 \times 10^3$ µmol·g$^{-1}$ h$^{-1}$. The results are shown in Table 2.

Example 5

5.0 wt % Ru/CaCN$_2$ was prepared in the same manner as in Example 1 except that the loading amount of Ru of the supported Ru material described in Example 1 was 5.0 parts by weight.

The ammonia synthesis reaction was carried out under the same conditions as in Example 1 using this supported Ru material as a catalyst. The synthesis rate of ammonia at 340° C. was $2.6 \times 10^3$ µmol·g$^{-1}$ h$^{-1}$. The results are shown in Table 2.

TABLE 2

| No. | Catalyst | Catalyst specific surface area (m$^2$ g$^{-1}$) | Ru dispersion (%) | NH$_3$ synthesis rate (µmol · g$^{-1}$ h$^{-1}$) | TOF (×10$^{-3}$ s$^{-1}$) |
|---|---|---|---|---|---|
| Example 3 | 0.5 wt % Ru/CaCN$_2$ | 8.5 | 30.7 | 544 | 10.8 |
| Example 4 | 1 wt % Ru/CaCN$_2$ | 9.1 | 16.3 | 634 | 11.9 |
| Example 1 | 2 wt % Ru/CaCN$_2$ | 7.0 | 9.4 | 3012 | 48.9 |
| Example 5 | 5 wt % Ru/CaCN$_2$ | 6.8 | 2.8 | 2575 | 57.1 |

Catalyst amount: 0.1 g, reaction temperature: 340° C., reaction gas flow rate: 60 mL/min, eaction gas composition: N$_2$/H$_2$ = 1/3, reaction pressure: 0.1 MPa (Comparison of Ammonia Synthesis Rate with Various Supports)

When the catalyst in which Ru was supported on CaCN$_2$ (Example 1) synthesized by the method of the present invention and the catalyst in which Ru was supported on commercial CaCN$_2$ (Comparative Example 1) were compared, the synthesis of ammonia was confirmed in Example 1. However, in Comparative Example 1, the synthesis of ammonia was not confirmed. Therefore, it was found that the synthesis method of the present invention was effective for utilizing CaCN$_2$ as a catalytic support for ammonia synthesis. In addition, CaCN$_2$ loaded with Ru had a high ammonia synthesis rate per weight and a high TOF value as compared to the conventional catalytic support (MgO, γ-Al$_2$O$_3$, or Cs/MgO) loaded with Ru. It was found that the catalyst of the present invention was a very good catalyst.

[Evaluation Test 1]

Figure 1:
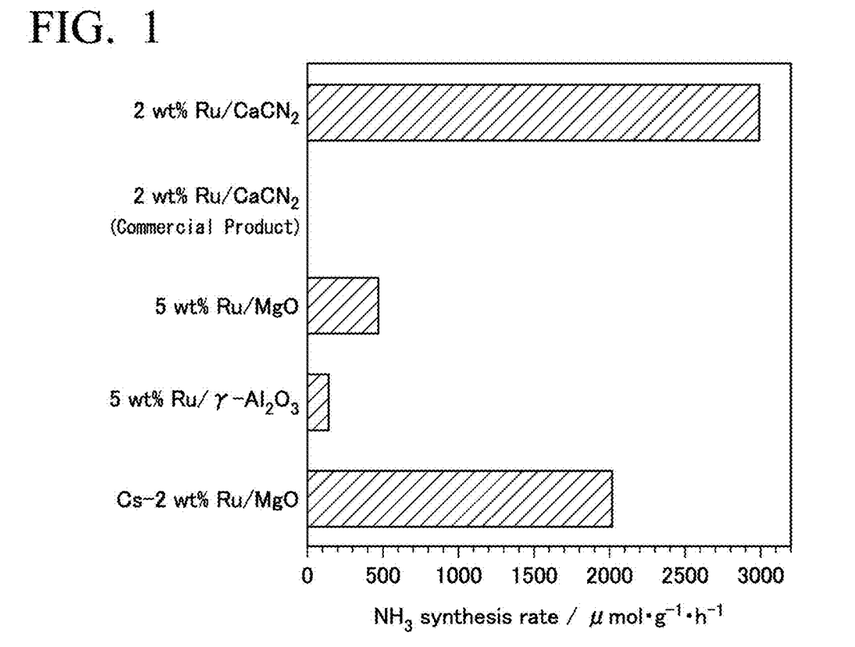
FIG. 1 is a graph showing the catalytic activity of an ammonia synthesis reaction by a catalyst in which Ru was supported on various supports.
Figure 2:
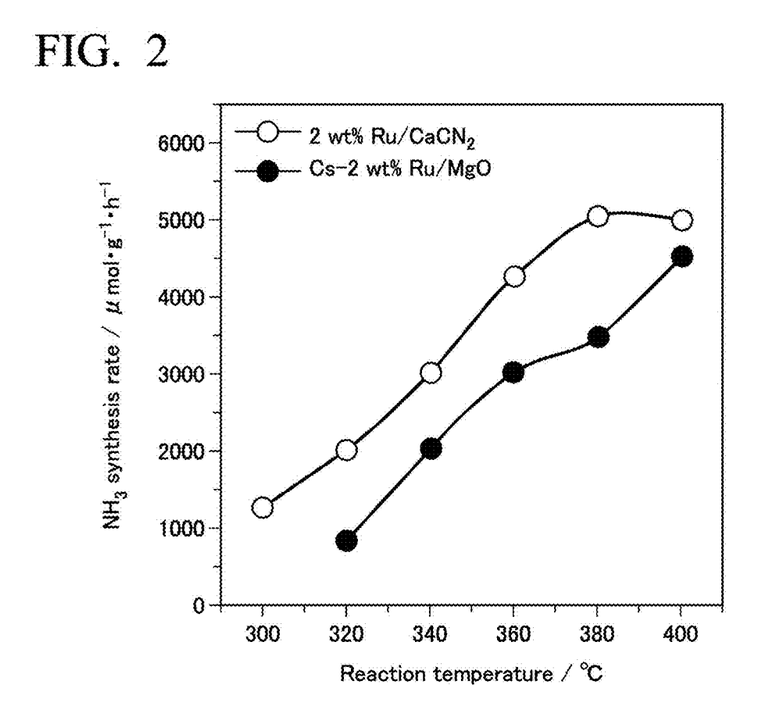
FIG. 2 is a graph showing an ammonia synthesis rate when ammonia synthesis reactions are performed at various reaction temperatures using $CaCN_2$ loaded with Ru and Cs/MgO loaded with Ru.

The ammonia synthesis reaction was performed under the same conditions as in Example 1 except for the reaction temperature, and the reaction temperature dependence of the catalyst was evaluated. The reaction was performed using 0.1 g of catalyst at the total gas flow rate of 60 mL/min including $N_2$: 15 mL/min and $H_2$: 45 mL/min and at atmospheric pressure. FIG. 2 shows the results of ammonia synthesis reactions at various reaction temperatures using 2 wt % Ru/$CaCN_2$ and Cs-2 wt % Ru/MgO as catalysts. As shown in the results, 2 wt % Ru/$CaCN_2$ has high catalytic activity in all temperature ranges evaluated compared with Cs-2 wt % Ru/MgO.

[Evaluation Test 2]

Figure 3:
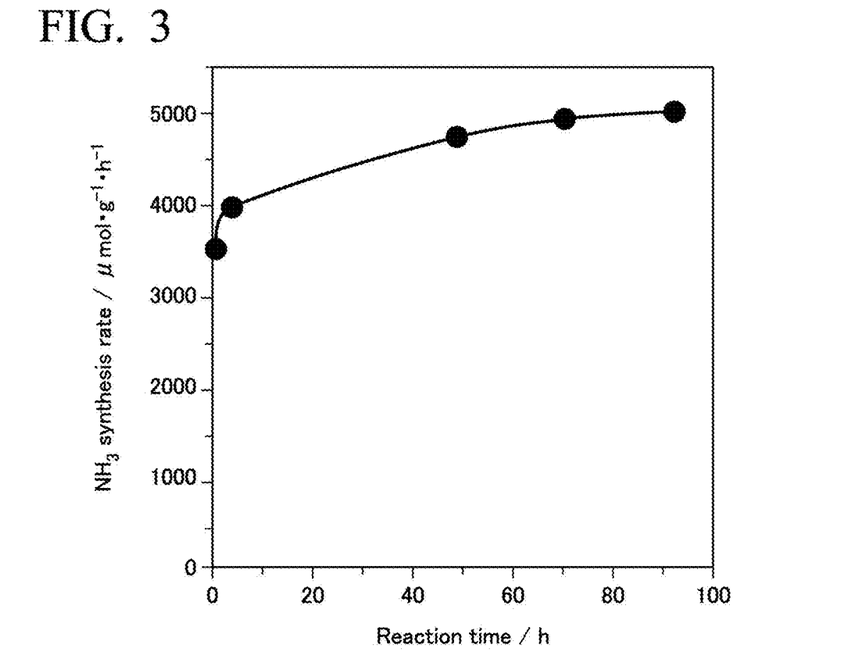
FIG. 3 is a graph showing the results of a stability evaluation test for the catalyst of Example 1.

The ammonia synthesis reaction was continued at a reaction temperature of 400° C. for 92.5 hours to evaluate the stability of the catalyst. FIG. 3 shows the results of ammonia synthesis using 2 wt % Ru/$CaCN_2$ of Example 1 as a catalyst. The catalyst activity gradually elevated from the start of the reaction and showed a constant value in about 70 hours. No decrease in catalytic activity was confirmed during the reaction, and it was found that ammonia was stably generated even in the reaction of 90 hours or more.

Example 6

<Ammonia Decomposition Reaction>

Figure 4:
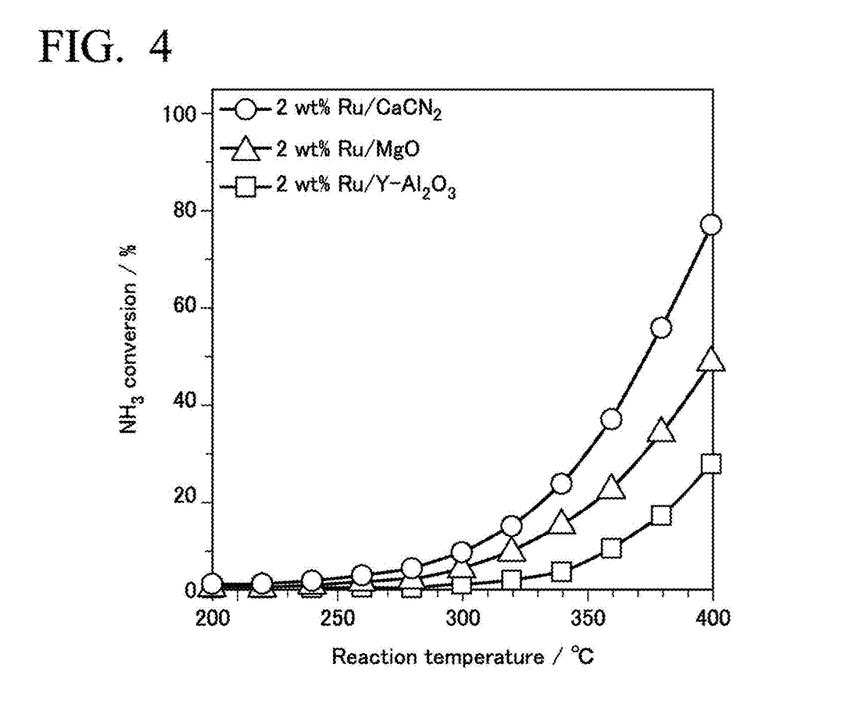
FIG. 4 is a graph showing the results of the ammonia decomposition reaction shown in Example 6, Comparative Example 5 and Comparative Example 6.

Using 2 wt % Ru/$CaCN_2$ prepared in Example 1 as a supported metal catalyst, ammonia decomposition reaction to produce nitrogen and hydrogen was carried out. 0.1 g of the supported Ru material was packed in a glass tube as an ammonia decomposition catalyst, and the reaction was carried out in a fixed bed flow reactor. The gas flow rate was set to $NH_3$: 5 mL/min, and the reaction pressure was 0.1 MPa. The gas discharged from the fixed bed flow reactor was quantified by a gas chromatograph. The conversion of ammonia decomposition at 400° C. was 76.4%. The results are shown in FIG. 4.

Comparative Example 5

2 wt % Ru/MgO was prepared by the same method as Comparative Example 2 except that the loading amount of Ru of Ru/MgO described in Comparative Example 2 was 2 parts by weight.

Using this as a catalyst, an ammonia decomposition reaction was carried out under the same conditions as in Example 6. The conversion of ammonia decomposition at 400° C. was 47.3%. The results are shown in FIG. 4.

Comparative Example 6

2 wt % Ru/$\gamma$-$Al_2O_3$ was prepared in the same manner as in Comparative Example 3 except that the loading amount of Ru of Ru/$\gamma$-$Al_2O_3$ described in Comparative Example 3 was changed to 2 parts by weight.

Using this as a catalyst, an ammonia decomposition reaction was carried out under the same conditions as in Example 6. The conversion for ammonia decomposition at 400° C. was 25.9%. The results are shown in FIG. 4.

From Example 6, it was found that when the supported metal material of the present invention is used as a supported metal catalyst in an ammonia decomposition reaction, ammonia can be decomposed with high efficiency.

Example 7

<Preparation of $CaCN_2$ Loaded with Co>

1 g of the $CaCN_2$ powder obtained in Example 1 was mixed with 0.059 g of $Co_2(CO)_8$ powder in a glove box under an Ar atmosphere and sealed in an evacuated silica tube. The temperature was raised stepwise to 250° C. while rotating the above-described sealed sample and then heated at the same temperature for 2 hours. As a result, $CaCN_2$ on which 2 wt % of metal Co was supported (hereinafter sometimes referred to as supported Co material) was obtained. The BET specific surface area of the supported Co material was 6.9 $m^2g^{-1}$.

An ammonia synthesis reaction was carried out under the same conditions as in Example 1 using the above-described supported Co material as a catalyst. The synthesis rate of ammonia at 340° C. was $0.2 \times 10^3$ μmol·$g^{-1}$ $h^{-1}$. The results are shown in Table 3.

Example 8

<Preparation of $CaCN_2$ Loaded with Fe>

$CaCN_2$ on which 2 wt % of metallic Fe was supported (hereinafter, supported Fe material) was prepared by the same manner as in Example 7 except that 0.066 g of $Fe_2(CO)_9$ powder was used instead of using $Co_2(CO)_8$. The BET specific surface area of the supported Fe material was 7.0 $m^2g^{-1}$.

The ammonia synthesis reaction was carried out under the same conditions as in Example 1 using the supported Fe material as a catalyst. The synthesis rate of ammonia at 340° C. was $0.4 \times 10^3$ μmol·$g^{-1}$ $h^{-1}$. The results are shown in Table 3.

TABLE 3

| No. | Catalyst | Catalyst specific surface area ($m^2$ $g^{-1}$) | $NH_3$ synthesis rate (μmol · $g^{-1}$ $h^{-1}$) |
|---|---|---|---|
| Example 1 | 2 wt % Ru/$CaCN_2$ | 7.0 | 3012 |
| Example 7 | 2 wt % Co/$CaCN_2$ | 6.9 | 231 |
| Example 8 | 2 wt % Fe/$CaCN_2$ | 7.0 | 418 |

Catalyst amount: 0.1 g, reaction temperature: 340° C., reaction gas flow rate: 60 mL/min, reaction gas composition: $N_2/H_2$ = 1/3, reaction pressure: 0.1 MPa Example 9

<Synthesis of $SrCN_2$>

$SrCN_2$ was synthesized by heating $SrCO_3$ (manufactured by Kojundo Chemical Laboratory Co., Ltd., powder, BET specific surface area: 6.1 $m^2g^{-1}$) at 600° C. for 20 hours under $NH_3$ flow (100 mL/min). The obtained $SrCN_2$ was in the form of powder, and the BET specific surface area was 2.8 $m^2g^{-1}$.

<Preparation of $SrCN_2$ Loaded with Ru>

2 wt % Ru/$SrCN_2$ was prepared in the same manner as in Example 1 except that the obtained $SrCN_2$ was used. The BET specific surface area of this supported Ru material was 3.6 $m^2g^{-1}$.

The ammonia synthesis reaction was carried out under the same conditions as in Example 1 using the above-mentioned support as a catalyst. The synthesis rate of ammonia at 340° C. was $3.5 \times 10^3$ μmol·$g^{-1}$ $h^{-1}$. The TOF was $74.4 \times 10^{-3}$ $s^{-1}$. The results are shown in Table 4.

TABLE 4

| No. | Catalyst | Catalyst specific surface area ($m^2 g^{-1}$) | Ru dispersion (%) | $NH_3$ synthesis rate ($\mu mol \cdot g^{-1} h^{-1}$) | TOF ($\times 10^{-3} s^{-1}$) |
|---|---|---|---|---|---|
| Example 1 | 2 wt % Ru/CaCN$_2$ | 7.0 | 9.4 | 3012 | 48.9 |
| Example 9 | 2 wt % Ru/SrCN$_2$ | 3.6 | 7.3 | 3545 | 74.4 |

Catalyst amount: 0.1 g, reaction temperature: 340° C., reaction gas flow rate: 60 mL/min, reaction gas composition: $N_2/H_2 = 1/3$, reaction pressure: 0.1 MPa

[Evaluation Test 3]

Table 3 shows the ammonia synthesis activity when using a supported metal material in which Co or Fe, instead of Ru, was supported on CaCN$_2$ as a catalyst. Compared with the supported metal material of Example 1, the supported metal material on which Co or Fe was supported (Examples 7 and 8) was inferior in performance as a catalyst, but it showed that the catalytic performance was comparable to the conventional Ru catalysts except for Ru—Cs/MgO of Comparative Example 4.

Table 4 shows the ammonia synthesis activity when using a supported metal material in which Ru was supported on SrCN$_2$ as a catalyst. Compared to the supported metal material of Example 1, the supported metal material of Example 9 shows higher catalytic performance at both the ammonia synthesis rate and TOF. The supported metal material of Example 9 exhibited higher catalytic performance in TOF than any one of the conventional Ru catalysts, and the supported metal material of Example 9 also exhibited higher catalytic performance in ammonia synthesis rate than any one of the conventional Ru catalysts.

INDUSTRIAL APPLICABILITY

The supported metal material of the present invention can be used as a supported metal catalyst and exhibits high catalytic activity when the supported metal catalyst of the present invention is used.

The supported metal catalyst of the present invention is particularly suitable as a catalyst for ammonia synthesis because it has high ammonia synthesis activity even at a low reaction temperature and a low reaction pressure. By producing ammonia using the supported metal catalyst of the present invention, ammonia can be synthesized with less energy, and even if the synthesis reaction is repeated, the catalyst activity is not lowered. Therefore, synthesis can be carried out at a high efficiency and with a long-term chemical and thermal stability.

The supported metal material and the supported metal catalyst of the present invention can be obtained by loading a transition metal on a cyanamide compound. Since the cyanamide compound is a compound that can be handled relatively easily, it can be manufactured in a simple and highly safe method, and further cost reduction can be expected.

The supported metal material of the present invention has high efficiency as an ammonia decomposition catalyst and is, therefore, suitable for a method of producing hydrogen by ammonia decomposition.

What is claimed is:

1. A method for producing ammonia, comprising a step of reacting nitrogen and hydrogen in the presence of a supported metal material in which a transition metal is supported on a support, wherein a reaction temperature for reacting nitrogen and hydrogen is 100° C. or more and 600° C. or less, and a reaction pressure for reacting nitrogen and hydrogen is 0.1 MPa or more and 20 MPa or less, wherein the support is a cyanamide compound represented by the following general formula (1):

$$MCN_2 \qquad (1)$$

wherein M is at least one selected from the group consisting of Sr and Ba;

the transition metal is at least one selected from the group consisting of Ru, Co, and Ni;

a specific surface area of the supported metal material is 5 $m^2g^{-1}$ or more, and 50 $m^2g^{-1}$ or less; and a specific surface area of the cyanamide compound is 1 $m^2g^{-1}$ or more, and 50 $m^2g^{-1}$ or less.

2. The method for producing ammonia according to claim 1, wherein a volume ratio of hydrogen to nitrogen (H$_2$/N$_2$= (volume)/(volume)) when reacting nitrogen and hydrogen is 0.4 or more and 3 or less.

3. The method for producing ammonia according to claim 1, wherein a loading amount of the transition metal supported on the support of the supported metal material is 0.01 parts by weight or more and 50 parts by weight or less with respect to 100 parts by weight of the support.

4. The method for producing ammonia according to claim 3, wherein the transition metal of the supported metal material is Ru.

5. The method for producing ammonia according to claim 1, wherein the transition metal of the supported metal material is Ru.

* * * * *